# 2,956,999

AROMATIC DERIVATIVES OF DESERPIDINE AND PROCESS OF PRODUCING SAME

Leon Velluz, Paris, and Georges Muller, Nogent-sur-Marne, France, assignors to Les Laboratoires Francais de Chimiotherapie, Paris, France, a body corporate of France No Drawing. Filed Oct. 14, 1958, Ser. No. 767,101

Claims priority, application France Oct. 15, 1957

8 Claims. (Cl. 260—287)

The present invention relates to a new aromatic derivative of deserpidine and, more particularly, to 9,10-benzo deserpidine, and to a process of producing the same.

Deserpidine compounds belong to the reserpine series. Such compounds are of considerable interest as they represent physiologically active compounds with noteworthy pharmacodynamic properties. More particularly, such compounds are of great value as hypotensive agents and as tranquilizers.

It is one object of the present invention to provide a new and valuable substituted deserpidine compound having such valuable properties.

Another object of the present invention is to provide suitable intermediates for the synthesis of said new and valuable substituted deserpidine compound.

Still another object of the present invention is to provide a simple and effective process of producing said new and valuable substituted deserpidine compound and its intermediates.

Other objects of the present invention and advantageous features thereof will become apparent as the description proceeds.

In principle, the present invention relates to 9,10-benzo deserpidine of Formula IX

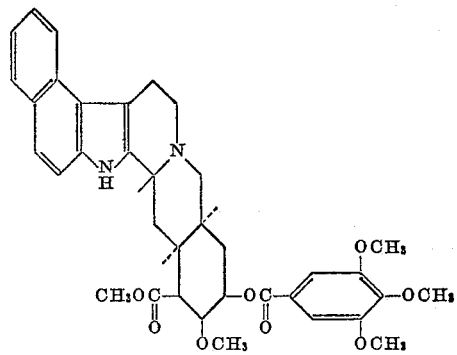

Said compound has a melting point of 248° C. and a rotatory power $[\alpha]_D^{20} = -172° \pm 5°$ (concentration: 0.5% in chloroform).

The process of producing said new and valuable aromatic derivative of deserpidine may be illustrated by the following reaction scheme:

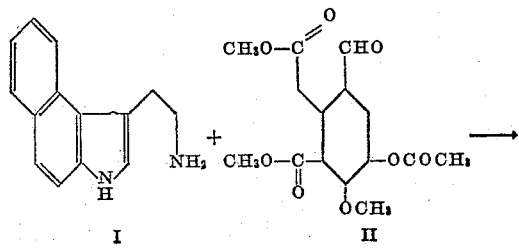

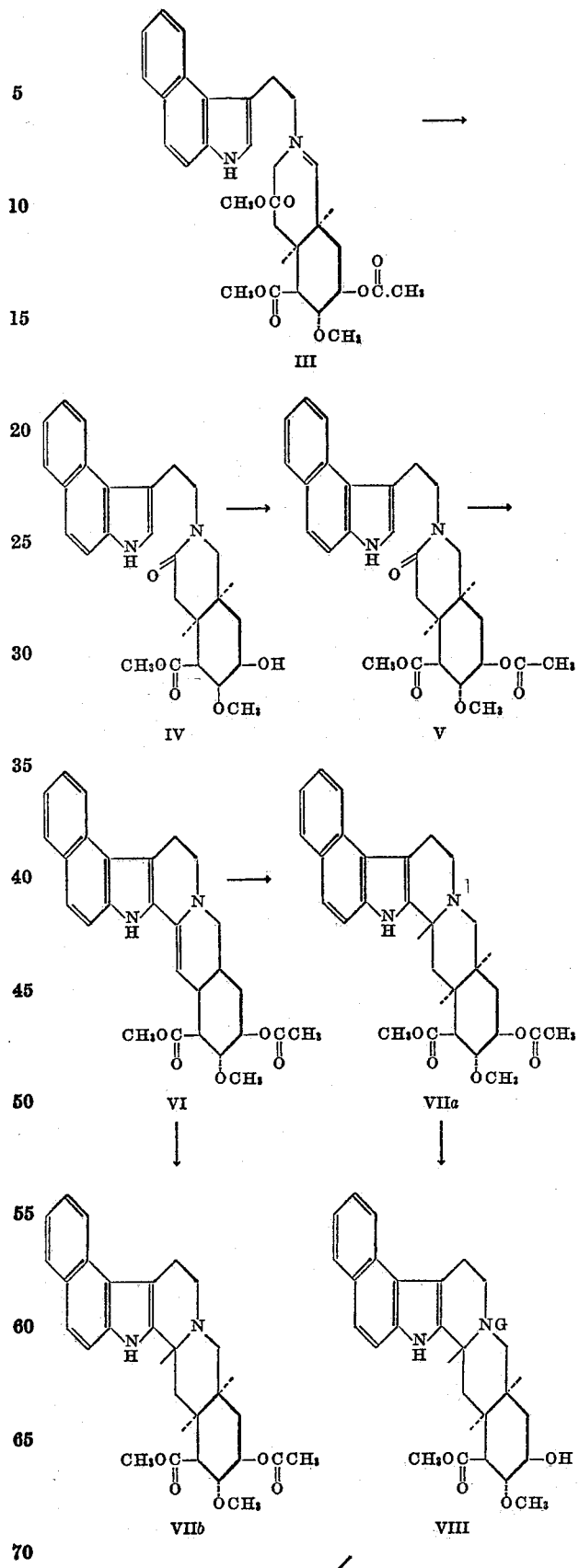

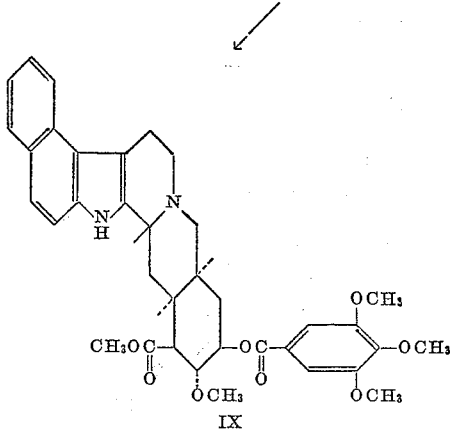

IX

According to the present invention, 9,10-benzo deserpidine is prepared by condensing 4,5-benzo tryptamine of Formula I prepared according to the copending application Serial No. 760,535, filed September 12, 1958, and entitled "4,5-Benzo Tryptamine and Process of Producing Same" with the methyl ester of 1β-carboxyl methyl-2β-methoxy carbonyl-3α-methoxy-4β-acetoxy-6β-formyl cyclohexane of Formula II prepared according to copending application Serial No. 693,028, filed October 29, 1957, and entitled "Polycyclic Compounds and Process of Preparing Same," or according to copending application Serial No. 727,780, filed April 11, 1958, and entitled "Process of Producing a Substituted Aldehyde," and by proceeding via the following intermediates which have not yet been described in the literature:

The methyl ester of 9,10-benzo-16β-methoxy carbonyl-17α-methoxy - 18β - acetoxy-2,3,4-diseco-$\Delta^{4(21)}$, 20α-yohimbene-3-carboxylic acid of Formula III.

The dextrorotatory 9,10-benzo-16β-methoxy carbonyl-17α-methoxy-18β-hydroxy 3-oxo - 2,3-seco-20α-yohimbane of Formula IV.

The levorotatory 9,10-benzo-16β-methoxy carbonyl-17α-methoxy-18β-acetoxy-3-oxo-2,3-seco - 20α - yohimbane of Formula V.

The dextrorotatory 9,10-benzo-16β-methoxy carbonyl-17α-methoxy-18β-acetoxy-$\Delta^{3(14)}$, 20α - yohimbene of Formula VI.

The levorotatory 9,10-benzo-16β-methoxy carbonyl-17α-methoxy-18β-acetoxy-3β,20α-yohimbane of Formula VIIa.

The levorotatory 9,10-benzo-16β-methoxy carbonyl-17α-methoxy-18β-hydroxy-3β,20α-yohimbane of Formula VIII.

Preferably the procedure given hereinafter is followed in producing the final compound of Formula IX.

The condensation product of Formula III resulting from the reaction of 4,5-benzo tryptamine of Formula I with the methyl ester compound of Formula II in a neutral solvent such as tetrahydrofurane is subjected to the action of an alkali metal boronhydride whereby the dextrorotataory 9,10-benzo-16β-methoxy carbonyl-17α-methoxy-18β-hydroxy-3-oxo-2,3-seco-20α-yohimbane of Formula IV is obtained. This compound is converted by acylation into the corresponding levorotatory 18β-acetoxy compound of Formula V, which is subjected to the action of phosphorus oxychloride at elevated temperature so as to cause cyclization. After a treatment with ammonia in acetone, the dextrorotatory 9,10-benzo-16β-methoxy carbonyl-17α-methoxy-18β-acetoxy-$\Delta^{3(14)}$, 20α - yohimbene of Formula VI is obtained, which is hydrogenated by means of metallic zinc in formic acid to the levorotatory 9,10 - benzo - 16β-methoxy carbonyl-17α-methoxy-18β - acetoxy - 3β,20α-yohimane of Formula VIIa. By hydrogenation of the unsaturated yohimbene compound of Formula VI by means of sodium boronhydride, the isomeric levorotatory 9,10-benzo-16β-methoxy carbonyl-17α-methoxy-18β-acetoxy-3,20α-yohimbane of Formula VIIb is obtained. The compound VIIa is then subjected in a further reaction step to partial saponification by means of potassium boronhydride and the resulting levorotatory 9,10-benzo-16β-methoxy carbonyl-17α-methoxy-18β-hydroxy-3β,20α-yohimbane of Formula VIII is converted into its trimethoxy benzoate, i.e. into the levorotatory 9,10-benzo deserpidine of Formula IX.

The following examples serve to illustrate the present invention without, however, limiting the same thereto. More particularly, the nature of the solvents used, the order in which the reactants are introduced into the reaction vessel, the reaction temperature and duration, and the like may be varied by those skilled in the art in accordance with the principles set forth herein and in the claims annexed hereto. Final trimethoxy benzoylation may be carried out by means of trimethoxy benzoic acid anhydride in the presence of a pyridine base and triethylamine according to the process described in copending application Serial No. 727,782, filed April 11, 1958, and entitled "Esters of Compounds of the Reserpine Series and Process of Making Same."

The melting points given in the examples are instantaneous melting points determined on the Maquenne block.

EXAMPLE 1

*Preparation of the methyl ester of 9,10-benzo-16β-methoxy carbonyl-17α-methoxy-18β-acetoxy-2-3,3-4-diseco-$\Delta^{4(21)}$, 20α-yohimbene-3-carboxylic acid (Formula III)*

1.8 g. of the levorotatory 1β-carboxy methyl-2β-methoxy carbonyl-3α-methoxy-4β-acetoxy-6β-formyl cycylohexane obtained according to copending application Serial No. 693,028, filed October 29, 1957, and entitled "Polycyclic Compounds and a Process of Preparing Same" are suspended in 10 cc. of anhydrous ether. After cooling in an ice bath, 20 cc. of a solution of diazomethane in methylene chloride are added thereto within 10 minutes. A homogeneous solution is obtained which is allowed to stand for 10 minutes in the ice bath and is then evaporated to dryness in a vacuum.

The residue is dissolved in 3 cc. of tetrahydrofurane and a solution of 1 g. of 4,5 -benzo tryptamine of Formula I in 40 cc. of tetrahydrofurane is added thereto. The tryptamine compound is prepared according to the process described in copending application Serial No. 760,535, filed September 12, 1958, and entitled "4,5-Benzo Tryptamine and Process of Producing Same" by reacting β-naphthyl diazonium chloride with the potassium salt of 2-piperidone-3-carboxylic acid, cyclization of the resulting 3-(β-naphthyl)hydrazone of 2,3-dioxo piperidine by the action of gaseous hydrochloric acid whereby 5,6-benzol-1,2,3,4-tetrahydro-1-oxo-β-carboline is obtained which is saponified into 4,5-benzo-tryptamine-2-carboxylic acid, on decarboxylating said tryptamine carboxylic acid compound, 4,5-benzo tryptamine is obtained.

The reaction mixture is allowed to stand for 15 minutes at a temperature of 30° C. and is then evaporated to dryness in a vacuum. The resinous residue consists of the desired compound of Formula III which is without further purification used for the next reaction step.

The compound is not described in the literature.

EXAMPLE 2

*Preparation of the dextrorotatory 9,10-benzo-16β-methoxy carbonyl-17α-methoxy-18β-hydroxy-3-oxo-2-3-seco-20α-yohimbane (Formula IV)*

The resinous compound III, obtained according to the preceding example is dissolved in 20 cc. of anhydrous methanol. The solution is cooled to +5° C. and 500 mg. of potassium boronhydride are added thereto. The reaction mixture is allowed to stand for 5 minutes at +5° and for 5 more minutes at 20° C. It is then refluxed for half an hour. After cooling, the mixture is poured into water, the resulting mixture is extracted with methylene chloride. The extracts are dried and evaporated to dryness. The solid residue is triturated with acetone, filtered with suction, washed with acetone and dried at 90° C. 1.72 g. (80% of the theoretical yield) of the desired compound of Formula IV are obtained. The compound has a melting point of 237° C. It is used without further purification in the next reaction step.

The pure compound is obtained by recrystallization from acetone. The new compound is obtained in the form of colorless prisms which are soluble in alcohol and chloroform, slightly soluble in acetone, and insoluble in ether. It has a rotatory power $[\alpha]_D^{20}=+42°\pm5°$ (concentration: 0.5% in pyridine).

Analysis.—$S_{26}H_{30}O_5N_2=450.51$. Calculated: 69.31% C; 6.71% H; 17.76% O; 6.22% N. Found: 69.1% C; 6.8% H; 18.1% O; 6.3% N.

The infrared spectrum corresponds to the assumed structure and shows the presence of the imino group (NH), the hydroxyl group, the ester group, and the lactam group.

EXAMPLE 3

Preparation of the levorotatory 9,10-benzo-16β-methoxy carbonyl-17α-methoxy-18β-acetoxy-3 - oxo - 2-3 - seco-20α-yohimbane (Formula V)

A mixture of 5 g. of the compound of Formula IV obtained according to the preceding example, 20 cc. of pyridine, and 12.5 cc. of acetic acid anhydride is heated to 90° C. for 15 minutes. After cooling to 40° C., 10 cc. of water are added and the mixture is allowed to stand for 15 minutes. The resulting compound of Formula V is precipitated by the addition of water, filtered with suction, washed with water and acetone, and dried at 90° C. 5.05 g. of rhombohedral crystals are obtained which are soluble in alcohol and chloroform, slightly soluble in acetone and insoluble in ether. The compound has a melting point of 262° C. and a rotatory power $[\alpha]_D^{20}+-10°\pm5°$ (concentration: 0.5% in pyridine).

Analysis.—$C_{28}H_{32}O_6N_2=492.55$. Calculated: 68.27% C; 6.55% H; 19.4% O; 5.69% N. Found: 68.3% C; 6.5% H; 19.7% O; 5.8% N.

The infrared spectrum confirms the assumed structure. The compound has not yet been described in the literature.

EXAMPLE 4

Preparation of the dextrorotatory 9,10-benzo-16β-methoxy carbonyl - 17α - methoxy - 18β - acetoxy - $\Delta^{3(14)}$,20α-yohimbene (Formula VI)

5 g. of compound V obtained according to the preceding example are added to 20 cc. of phosphorus oxychloride. The mixture is refluxed for one and a half hours. After evaporation to dryness, the residue is taken up with 50 cc. of acetone and an excess of ammonia is added thereto at +5° C. After the addition of water until crystallization sets in, the mixture is filtered with suction, the crystals are washed with water and methanol and dried at 80° C. 4.7 g. (corresponding to 98% of the theoretical yield) of the desired compound of Formula VI are obtained which has a melting point of about 260° C. and can be used as such in the following hydrogenation step.

The analytically pure compound is prepared by recrystallization from aqueous acetone. The new compound is obtained in the form of orange prisms which are soluble in acetone and chloroform and insoluble in alcohol and ether. The compound has a rotatory power $$[\alpha]_D^{20}=+56°\pm10°$$

(concentration: 0.5% in dimethylformamide).

Analysis.—$C_{28}H_{30}O_5N_2=474.54$. Calculated: 70.86% C; 6.37% H; 16.86% O; 5.90% N. Found 70.8% C; 6.4% H; 17.1% O; 5.6% N.

The infrared spectrum corresponds to the assumed structure and shows the presence of a double bond.

EXAMPLE 5

Preparation of the levorotatory 9,10-benzo-16β-methoxy carbonyl-17α-methoxy-18β-acetoxy-3β,20α - yohimbane (Formula VIIa)

12.37 g. of compound VI obtained according to the preceding example, 124 cc. of water, and 124 cc. of technical grade formic acid are mixed with stirring. 24 g. of zinc powder are added to the mixture at +5° C. Stirring is continued at +5° C. for 15 minutes and then at +20° C. for 2 hours. The mixture is filtered with suction, the filter residue is washed with water, and the combined filtrates are poured on ice. After the addition of an excess of ammonia, the mixture is extracted with methylene chloride containing 15% of methanol. The extracts are evaporated to dryness and the residue is triturated with 50 cc. of acetone, filtered with suction, washed with acetone, and dried at 90° C. 6.62 g. (corresponding to 53% of the theoretical yield) of the desired compound of Formula VIIa are obtained. It has a melting point of 312° C. and is used as such in the next reaction step.

The pure compound is obtained by recrystallization from acetone, in the form of white-yellowish prisms which are soluble in chloroform, slightly soluble in acetone, and insoluble in alcohol and ether. The compound has a rotatory power $[\alpha]_D^{20}=-170°\pm5°$ (concentration: 0.5% in pyridine).

Analysis.—$C_{28}H_{32}O_5N_2=476.55$. Calculated: 70.57% C; 6.77% H; 16.79% O; 5.83% N. Found: 70.6% C; 6.9% H; 16.8% O; 5.7% N.

The infrared spectrum confirms the assumed structure. The compound has not yet been described in the literature.

EXAMPLE 6

Preparation of the levorotatory 9,10-benzo-16β-methoxy carbonyl-17α-methoxy - 18β - acetoxy - 20α - yohimbane (Formula VIIb)

Excess sodium boronhydride is added at +5° C. to a mixture of 200 mg. of compound VI obtained according to Example 4, 4.6 cc. of methanol, and 0.6 cc. of dilute hydrochloric acid. Decolorization of the reaction mixture and crystallization take place during reaction. After the addition of 6 cc. of water, the separated crystals are filtered with suction, washed with water and methanol, and dried at 90° C. 177 mg. (corresponding to 88% of the theoretical yield) of the desired compound of Formula VIIb of the melting point 290° C. are obtained in the form of white-yellowish prisms. The new compound may be recrystallized from aqueous acetone. It is soluble in acetone and chloroform and insoluble in alcohol and ether. It has a rotatory power $[\alpha]_D^{20}=-20°\pm5°$ (concentration: 0.5% in pyridine).

The infrared spectrum corresponds to the assumed structure and distinguishes the compound from the corresponding 3β-isomer described in Example 5 hereinabove.

EXAMPLE 7

Preparation of the levorotatory 9,10-benzo-16β-methoxy carbonyl-17α-methoxy-18β - hydroxy - 3β,20α - yohimbane (Formula VIII)

A mixture of 5.62 g. of compound VIIa obtained according to Example 5, 280 cc. of methanol, and 2.8 g. of potassium boronhydride is heated under reflux. The starting material dissolves and the compound of Formula VIII crystallizes as the reaction proceeds. After 7 hours, the mixture is concentrated to a volume of 20 cc. The crystals are filtered with suction, washed with water and methanol, and dried at 90° C. 4.95 g. (corresponding to 97% of the theoretical yield) of the desired compound of Formula VIII are obtained. The compound melts first at about 190° C. and then at 237° C. It may be used as such in the next reaction step.

The pure compound is prepared by recrystallization from aqueous acetone or from methanol. Depending on the crystallization solvent, two different forms are obtained. Recrystallization from methanol yields prisms, crystallization from aqueous acetone rectangular plates. The new compound is soluble in acetone, slightly soluble in alcohol and chloroform, and insoluble in ether. It is hygroscopic. $[\alpha]_D^{20} = -120° \pm 5°$ (concentration: 0.5% in pyridine).

Analysis.—$C_{26}H_{30}O_4N_2 = 434.52$. Calculated: 71.86% C; 6.96% H; 6.45% N. Found: 71.8% C; 7.0% H; 6.4% N.

EXAMPLE 8

*Preparation of the levorotatory 9,10-benzo-deserpidine (Formula IX)*

500 mg. of the compound of Formula VIII obtained according to the preceding example, 1.25 g. of 3,4,5-trimethoxy benzoyl chloride and 5 cc. of pyridine are heated in a sealed reaction tube at 75° C. for 17 hours. After cooling to 40° C., 2 cc. of water are added thereto. The reaction mixture is allowed to stand for 20 minutes at 30° C. and is poured on ice. After acidifying the mixture by the addition of hydrochloric acid, it is extracted with methylene chloride. The extracts are washed with water, neutralized by means of ammonia, and again washed with water. After drying, the crystals are filtered with suction. The residue is taken up with acetone and 2 N nitric acid is added to a pH value of 1.0 The separated crystalline nitrate is filtered with suction, washed with methanol, and suspended in 5 cc. of acetone. After the addition of excess ammonia, 9,10-benzo deserpidine of Formula IX is precipitated by the addition of water, filtered with suction, washed, and dried at 90° C. 510 mg. (corresponding to 71% of the theoretical yield) of a product are obtained which is purified by dissolving it in a very small amount of ethyl acetate and adding ether until crystallization sets in. After cooling in an ice bath, the crystals are filtered with suction, washed with water, and dried at 90° C.

9,10-benzo deserpidine of Formula IX, which represents a new product, is obtained in the form of white-yellowish, star-like crystals which are soluble in alcohol, acetone, benzene, and chloroform and slightly soluble in ether. The compound has a melting point of 248° C. and a rotatory power $[\alpha]_D^{20} = -172° \pm 5°$ (concentration: 0.5% in chloroform).

Analysis.—$C_{36}H_{40}O_8N_2 = 628.70$. Calculated: 68.77% C; 6.41% H; 20.36% O; 4.46% N. Found: 69.0% C; 6.7% H; 20.3% O; 4.6% N.

The infrared spectrum confirms the assumed structure.
We claim:

1. The methyl ester of 9,10-benzo-16β-methoxy carbonyl-17α - methoxy - 18β-acetoxy-2-3,3-4-diseco-$\Delta^{4(21)}$, 20α-yohimbene-3-carboxylic acid.
2. The dextrorotatory in pyridine 9,10-benzo-16β-methoxy carbonyl - 17α - methoxy-18β-hydroxy-3-oxo-2,3-seco-20α-yohimbane.
3. The levorotatory in pyridine 9,10-benzo-16β-methoxy carbonyl - 17α - methoxy-18β-acetoxy-3-oxo-2,3-seco-20α-yohimbane.
4. The dextrorotatory in dimethyl formamide 9,10-benzo - 16β - methoxy carbonyl - 17α-methoxy-18β-acetoxy-$\Delta^{3(14)}$, 20α-yohimbene.
5. A yohimbane compound selected from the group consisting of the levorotatory in pyridine 9,10-benzo-16β-methoxy carbonyl - 17α - methoxy-18β-acetoxy-3β,20α-yohimbane and the corresponding levorotatory in pyridine 3α-isomer.
6. The levorotatory in pyridine 9,10-benzo-16β-methoxy carbonyl - 17α - methoxy - 18β - hydroxy-3β,20α-yohimbane.
7. 9,10-benzo deserpidine.
8. The process of producing 9,10-benzo deserpidine which comprises the steps of condensing the methyl ester of 1β-carboxy methyl-2β-methoxy carbonyl-3α-methoxy-4β-acetoxy-6β-formyl cyclohexane with 4,5-benzo tryptamine in a neutral solvent, subjecting the resulting methyl ester of 9,10-benzo-16β-methoxy carbonyl 17α-methoxy-18β - acetoxy-2-3,3-4-diseco-$\Delta^{4(21)}$, 20α-yohimbene - 3-carboxylic acid to the action of an alkali metal boronhydride, acetylating in position 18 the resulting 9,10-benzo - 16β - methoxy carbonyl-17α-methoxy-18β-hydroxy-3-oxo-2,3-seco-20α-yohimbane by means of acetic acid anhydride in the presence of a pyridine base, heating the resulting 18-acetoxy compound with phosphorus oxychloride to cause ring closure and neutralizing the reaction mixture with ammonia, hydrogenating the resulting 9,10-benzo - 16β - methoxy carbonyl-17α-methoxy-18β - acetoxy-$\Delta^{3(14)}$, 20α-yohimbene by means of metallic zinc in formic acid, selectively saponifying the resulting 9,10 - benzo - 16β-methoxy carbonyl-17α-methoxy-18β-acetoxy-3β,20α-yohimbane by means of potassium boronhydride, esterifying the resulting 18β-hydroxy product by means of 3,4,5-trimethoxy benzoyl chloride in the presence of pyridine, and recovering said 9,10-benzo-deserpidine.

References Cited in the file of this patent
UNITED STATES PATENTS

| | | |
|---|---|---|
| 2,796,420 | Weisenborn | June 18, 1957 |
| 2,883,384 | Woodward | Apr. 21, 1959 |

OTHER REFERENCES

Schlittler et al.: Experientia, vol. XI, No. 2, pp. 64–65 (Feb. 15, 1955).